(12) United States Patent
Cai et al.

(10) Patent No.: US 11,575,796 B2
(45) Date of Patent: Feb. 7, 2023

(54) CHARGING POLICIES IN NETWORK ENTITIES THAT HAVE SEPARATE CONTROL PLANE AND USER PLANE

(71) Applicant: Nokia Solutions and Networks Oy, Espoo (FI)

(72) Inventors: Yigang Cai, Naperville, IL (US); Ranjan Sharma, New Albany, OH (US); Maryse Gardella, Velizy (FR)

(73) Assignee: Nokia Solutions and Networks Oy, Espoo (FI)

( * ) Notice: Subject to any disclaimer, the term of this patent is extended or adjusted under 35 U.S.C. 154(b) by 276 days.

(21) Appl. No.: 17/052,883

(22) PCT Filed: May 8, 2018

(86) PCT No.: PCT/US2018/031551
§ 371 (c)(1),
(2) Date: Nov. 4, 2020

(87) PCT Pub. No.: WO2019/216884
PCT Pub. Date: Nov. 14, 2019

(65) Prior Publication Data
US 2021/0218849 A1 Jul. 15, 2021

(51) Int. Cl.
*H04M 15/00* (2006.01)
*H04L 12/14* (2006.01)
*H04W 4/24* (2018.01)

(52) U.S. Cl.
CPC ........ *H04M 15/66* (2013.01); *H04L 12/1407* (2013.01); *H04M 15/64* (2013.01);
(Continued)

(58) Field of Classification Search
CPC .... H04M 15/66; H04M 15/64; H04M 15/775; H04M 15/785; H04M 15/8038; H04L 12/1407; H04W 4/24
See application file for complete search history.

(56) References Cited

U.S. PATENT DOCUMENTS 9,055,557 B1 * 6/2015 Bayar ............... H04W 28/0268
10,609,225 B2 * 3/2020 Chai ................... H04M 15/853
(Continued)

FOREIGN PATENT DOCUMENTS

EP 3151592 A1 4/2017

OTHER PUBLICATIONS

International Preliminary Report on Patentability dated Nov. 10, 2020 for International Application No. PCT/US2018/031551, 9 pages.

(Continued)

*Primary Examiner* — Pakee Fang
(74) *Attorney, Agent, or Firm* — Tong, Rea, Bentley & Kim, LLC (57) ABSTRACT

A control plane entity selects a subset of a plurality of user plane entities to support a charging session associated with a user based on charging policies for the plurality of user plane entities. The control plane entity allocates portions of a quota for the charging session to the control plane entity and the subset of the plurality of user plane entities based on the charging policies. In some cases, the control plane entity modifies the quotas that are allocated to the control plane entity or the subset of the plurality of user plane entities. Modifying the quotas can include redistributing unused portions of the quotas among the control plane entity and the subset of the plurality of user plane entities, e.g., in response to handover of the user equipment between user plane entities.

15 Claims, 7 Drawing Sheets

(52) U.S. Cl.
CPC ....... *H04M 15/775* (2013.01); *H04M 15/785* (2013.01); *H04M 15/8038* (2013.01); *H04W 4/24* (2013.01)

(56) References Cited

U.S. PATENT DOCUMENTS

| | | | | |
|---|---|---|---|---|
| 2013/0148498 A1* | 6/2013 | Kean | ................... | H04L 41/0893 |
| | | | | 370/230 |
| 2013/0176689 A1* | 7/2013 | Nishimura | .......... | H01L 23/3121 |
| | | | | 29/832 |
| 2017/0366679 A1* | 12/2017 | Mohamed | ........... | H04L 12/1467 |
| 2021/0152989 A1* | 5/2021 | Chai | ................... | H04L 12/1407 |

OTHER PUBLICATIONS

3rd Generation Partnership Project, "Study on control and user plane separation of EPC nodes", Technical Specification Group Services and System Aspects; Jun. 2016, 86 pages.
Huawei, "CUPS Charging Analysis", 3GPP TSG SA WG5 (Telecom Management), S5C-170010, Jul. 27, 2017, 7 pages.

* cited by examiner

CHARGING POLICIES IN NETWORK ENTITIES THAT HAVE SEPARATE CONTROL PLANE AND USER PLANE

CROSS-REFERENCE TO RELATED APPLICATIONS

The present application is a 371 application of PCT Patent Application Serial No. PCT/US2018/031551, entitled "CHARGING POLICIES IN NETWORK ENTITIES THAT HAVE SEPARATE CONTROL PLANE AND USER PLANE", and filed on May 8, 2018, the entirety of which is incorporated by reference herein.

BACKGROUND

Mobile communication systems provide a variety of services including streaming, social networking, electronic business, Internet searching, and the like. The services are extremely popular among users and user data traffic in mobile communication systems is expected to continue to increase for the foreseeable future. At the same time, users expect their quality of experience to improve. For example, users expect the latency of the mobile communication system to decrease despite the expected significant increase in traffic. At least in part to address these issues, the Third Generation Partnership Project (3GPP) is developing an architecture for mobile communication systems that separates portions of the system into control plane functionality and user plane functionality.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Current 3GPP standards require control and user plane separation (CUPS) to be implemented in a manner that supports conventional 3GPP features (such as policy and charging) transparently to all other network functions, which may or may not implement CUPS. As used herein, the phrase "user plane" refers to a portion of a routing or forwarding architecture that performs routing or forwarding of packets that arrive on an inbound interface. For example, the user plane can be implemented using routing tables to determine a path from the inbound interface through a forwarding fabric to the proper outgoing interface. The user plane can also be referred to as a data plane or a forwarding plane. As used herein, the phrase "control plane" refers to a portion of the routing architecture that transports messages to define network topology, authenticates devices, establishes user sessions, tracks device location, and authorizes access to data networks among other functions. For example, the control plane can be used to configure the routing tables that are used to forward packets on the user plane. Control plane logic can also be used to establish priority or quality-of-service for the packets or to identify packets that should be discarded.

In principle, control plane functions should interface with charging entities such as an online charging system (OCS), an off-line charging system (OFCS), a policy and charging rules function (PCRF), a policy control and charging (PCC) function, a policy control function (PCF), and the like. The control plane functions should also monitor usage information from user plane functions and manage charging of users for usage of the mobile communication system during a charging session. The user plane functions should monitor and report usage information to the control plane functions. However, the current 3GPP standards do not permit enhancements to charging protocols that would support features that are specific to a CUPS architecture. For example, the current 3GPP standards do not allow the OCS/OFCS or the PCRF to provide charging policies or criteria to Evolved Packet Core (EPC) network elements such as a serving gateway (SGW) or a packet data network (PDN) gateway (PGW) for selecting user plane functions or allocating usage quotas to the control plane or user plane functions within or outside EPC network elements.

FIGS. 1-7 disclose a control plane entity that is configured to select one or more user plane entities to support a charging session associated with a user based on charging policies or criteria received from an online charging system (OCS), a policy and charging rules function (PCRF), or a policy control function (PCF). The control plane entity allocates quotas to the selected user plane entities based on the charging policies or criteria. The quotas include charging credit control thresholds, charging quota thresholds, usage thresholds, and the like. In some embodiments, the control plane entity requests the charging policies or criteria from the PCRF in response to the user establishing a protocol data unit (PDU) session. In other embodiments, the charging policies are requested from the PCF. The request includes information identifying a set of candidate user plane entities and, in some cases, service features, location information, capacities, load levels, or other information characterizing each of the candidate user plane entities. The PCRF or PCF returns charging policies or criteria for the set of candidate user plane entities, such as charging rates or tariff groups for each of the candidate user plane entities. In some embodiments, the charging policies or criteria are valid for a time interval. Based on the received per-user plane entity charging policies or criteria, the control plane entity selects a subset of the set of candidate user plane entities to support the charging session. Some embodiments of the control plane entity select the subset based on additional information for the set of user plane entities such as charging priority levels, supported features, online/off-line charging preference, usage thresholds, usage timers, handover capabilities, and the like. The control plane entity also configures monitoring and reporting rules for the subset, such as rules to monitor quota usage and to report the quota usage at predetermined intervals, in response to quota usage exceeding a threshold, or in response to requests from the control plane entity.

The control plane entity manages the quotas that are allocated to the selected user plane entities based on the charging policies or criteria. Some embodiments of the control plane entity also manage the quotas based on parameters determined by a mobile network operator, reported from the selected user plane entities, received from a traffic detection function (TDF), and the like. The control plane function requests a single credit quota for the charging session associated with the user from a charging system such as an OCS/OFCS. Some embodiments of the control plane function allocate a first portion of the single credit quota to the control plane function and distribute a second portion of the single credit quota among the selected user plane entities. Service is then provided to the user based on the allocated quotas. The quotas that are allocated to the selected user plane entities can be handed over between the selected user plane entities. For example, if the PDU session for the user hands off from a first user plane entity to a second user plane entity, the control plane function can request that an unused portion of the quota allocated to the first user plane entity be re-distributed to the second user plane entity. The control plane function is also able to re-allocate some or all of the first portion of the single credit quota to one or more of the selected user plane entities. Allocating, distributing, or re-distributing portions of the single credit quota are performed based on one or more of usage heuristics, quota consumption histories, initiation of new traffic at a user plane entity, termination of existing traffic at a user plane entity, handover of traffic between user plane entities, and the like.

Figure 1:
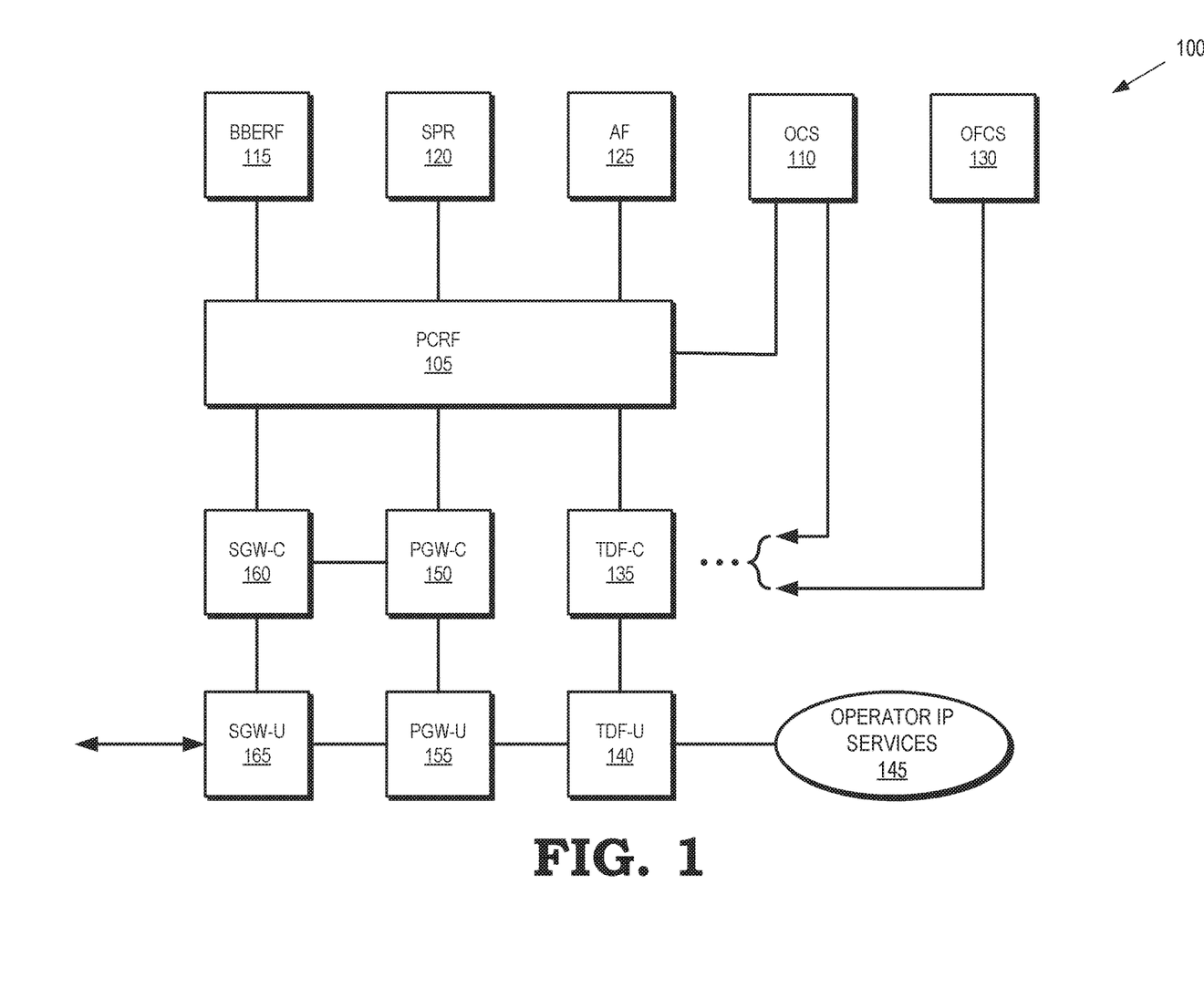
FIG. 1 is a block diagram of a network charging system according to some embodiments.

FIG. 1 is a block diagram of a network charging system 100 according to some embodiments. The architecture of some embodiments the network charging system 100 is partially defined according to the policy and charging control reference architecture defined by 3GPP TS 23.203, "Technical Specification Group Services and System Aspects, Policy and charging control architecture," which is incorporated herein by reference in its entirety. The elements of the network charging system 100 shown in FIG. 1 therefore correspond to elements of a Fourth Generation (4G) wireless communication system. In the interest of clarity, techniques for utilizing charging policies in communication systems that implement separate control plane and user plane functionality are discussed herein in the context of a 4G wireless communication system. However, some embodiments of the network charging system 100 are defined according to other reference architectures and the techniques disclosed herein are equally applicable to other reference architectures. In particular, some embodiments of the techniques disclosed herein are applicable to any reference architectures that implement separate control plane and user plane functionality. For example, some embodiments of the techniques disclosed herein are applicable to Fifth Generation (5G) reference architectures that implement a PCF instead of a PCRF.

The network charging system 100 includes a PCRF 105 that performs policy control decision-making and flow based charging control. An OCS 110 provides data usage tariffs or policies to the PCRF 105 to indicate the data usage tariffs for licensed or unlicensed frequency bands such as licensed frequency bands that operate according to Long Term Evolution (LTE-L), unlicensed LTE (LTE-U), and Wi-Fi. The OCS 110 provides the information in either a push mode (e.g., without a specific request from the PCRF 105) or a pull mode (e.g., in response to a request from the PCRF 105). The charging policies are determined based on a subscriber's charging account, an account associated with a group of subscribers, or other criteria. The data usage tariff for the unlicensed frequency band is typically lower than the data usage tariff for the licensed frequency band. However, some embodiments of the OCS 110 determine the data usage tariffs based on other factors such as network traffic, location of the user equipment, quality of service, and the like. Thus, the data usage tariff for the unlicensed frequency band may in some cases be higher than the data usage tariff for the licensed frequency band.

A bearer binding and event reporting function (BBERF) 115 is used to perform bearer binding and binding verification, as well as providing event reporting to the PCRF 105. A subscription profile repository (SPR) 120 contains all subscriber/subscription related information needed for subscription-based policies. The SPR 120 also stores information indicating IP-CAN bearer level rules used by the PCRF 105. An application function (AF) 125 offers applications that may require dynamic policy or charging control. The AF 125 communicates with the PCRF 105 to transfer dynamic session information to the PCRF 105. An off-line charging system (OFCS) 130 is also included in the network charging system 100 to provide policies for off-line charging.

The network charging system 100 implements control and user plane separation (CUPS). Some embodiments of the network charging system 100 therefore operate according to the standards defined by 3GPP TS 23.214, "Architecture enhancements for control and user plane separation of EPC nodes," which is incorporated herein by reference in its entirety. Elements in the network charging system 100 with separate control plane and user plane functionality are therefore implemented according to the following concepts. The network charging system 100 is able to interwork with networks that do not implement CUPS. Entities that are split into separate control planes and user planes are able to interwork with network entities in the same network that are do not use separate control and user planes. Entities that operate according to CUPS are not required to update user equipment or radio access networks. Selection functions implemented in a mobility management entity (MME) or the PCRF 105 are used to select control plane functionality of entities that have separate control and user planes. A control plane function is able to interface with one or more user plane functions to enable independent scalability of control plane functions and user plane functions.

A traffic detection function (TDF) in the network charging system 100 performs application detection and reporting of detected applications. In the illustrated embodiment, the TDF is separated into a control plane function (TDF-C) 135 and a user plane function (TDF-U) 140. The TDF-C 135 performs selection of the corresponding TDF-U 140 based on policies provided by the PCRF 105, charging policies provided by the OCS 110, and other parameters associated with operator IP services 145. The TDF-C 135 also configures reporting by the TDF-U 140 and network monitoring by the TDF-U 140, which reports the results of the network monitoring, e.g. by providing monitoring reports to the TDF-C 135. Information collected by the TDF-C 135 it is reported to the PCRF 105, e.g., by providing service data flow descriptors to the PCRF 105.

A PDN gateway (PGW) provides connectivity from user equipment to external packet data networks by being a point of exit and entry for traffic associated with the UE. In the illustrated embodiment, the PGW is separated into a control plane entity PGW-C 150 and a user plane entity PGW-U 155. A serving gateway (SGW) routes and forwards user data packets and acts as a mobility anchor for a user plane during handover is between base stations or different radio access technologies. The SGW terminates downlink data paths for idle user equipment and triggers paging when downlink data arrives for the user equipment. In the illustrated embodiment, the SGW is separated into a control plane entity SGW-C 160 and a user plane entities SGW-U 165. The control plane entities PGW-C 150 and SGW-C 160 request and receive charging policies from the PCRF 105. The control plane entities PGW-C 150 and SGW-C 160 are also able to request and receive charging policies from the OCS 110 and the OFCS 130.

Charging policies or other criteria received from the PCRF 105, OCS 110, or OFCS 130 are used to configure the separated charging and user plane entities. As used herein, the term "charging policy" is understood to refer to any policy or criteria that determines how a user is charged for using resources of the wireless communication system associated with the network charging system 100. In the interest of clarity, the PGW is discussed as an example of a network entity that is separated into a control plane entity (PGW-C 150) and one or more user plane entities (PGW-U 155). However, the same or similar techniques are also applicable to other entities that implement separate control plane and user plane entities such as the TDF-C 135/TDF-U 140 and the SGW-C 160/SGW-U 165 in some embodiments of the network charging system 100. Furthermore, although a single TDF-U 140, PGW-U 155, and SGW-U 165 are shown in FIG. 1, each control plane entity is potentially associated with multiple user plane entities, as discussed in detail below.

Control plane entities dynamically select corresponding user plane entities based on charging policies supplied by the PCRF 105, OCS 110, or OFCS 130. In the illustrated embodiment, the PGW-C 150 requests charging policies from one or more of the PCRF 105, the OCS 110, or the OFCS 130 in response to a user initiating a communication session such as a PDU session. The request includes identifiers of candidate user plane entities and, in some cases, other information associated with the candidate user plane entities. In response to the request, the PCRF 105, the OCS 110, or the OFCS 130 provide charging policies for each of the candidate user plane entities. The PGW-C 150 then selects a subset including one or more PGW-U 155 from the set of candidates to support the communication session based on the received charging policies. In some embodiments, the PGW-C 150 is also able to choose the one or more PGW-U 155 based on other information such as parameters received from the operator IP services 145 information reported by user plane entities, or network monitoring from entities such as the TDF-C 135.

Control plane entities perform quota management for the corresponding user plane entities based on the charging policies supplied by the PCRF 105, OCS 110, or OFCS 130. In the illustrated embodiment, the PGW-C 150 requests a total quota from the OCS 110 and then allocates/distributes portions of the quota to the PGW-C 150 and the one or more selected PGW-U 155 to support data and control signaling by the corresponding entities. The portion of the quota allocated to the PGW-C 150 is not available for handover to other control plane entities, but the PGW-C 150 is able to redistribute unused portions of its quota to the one or more selected PGW-U 155. The portions of the quotas allocated to the PGW-U 155 are available for redistribution to other user plane entities, e.g., in response to handover of a user's communication session between the different user plane entities. Allocation, distribution, or redistribution of the quota is performed based on policies using information including types of the user plane entities, service types, charging modes, and the like.

Some embodiments of the PGW-C 150 transmit a policy and charging control (PCC) request to the PCRF 105 to request charging policies for the candidate user plane entities in response to establishment of a PDU session. The PCC request includes information identifying the PGW-C 150 and, in some cases, credit management and pooling preferences for the PGW-C 150. The PCC request also includes information identifying the candidate user plane entities such as identifiers of the candidate user plane entities, service features supported by the candidate user plane entities, location information for the candidate user plane entities, capacities of the candidate user plane entities, current loading levels of the candidate user plane entities, location information for the user equipment that establish the PDU session, and the like. Some embodiments of the PCC request include one or more of dynamic loading information for the candidate user plane entities, relative statically capacities among user plane functions supporting the same data network name (DNN), capabilities of the candidate user plane entity, functionality required to support the PDU session, the DNN, a PDU session type (e.g., IPv4, IPv6, ethernet, or unstructured), a static IP address or prefix, session and service continuity (SSC) modes for the PDU session, a user equipment subscription profile, and access identifier, and local operator policies, a radio access technology for the user equipment, and the like.

In response to receiving the PCC request, the PCRF 105 locates the requested charging policies. The PCRF 105 determines whether the requested charging policy is stored locally on the PCRF 105. If so, the PCRF 105 returns the requested charging policy to the PGW-C 150. If not, the PCRF 105 communicates with the OCS 110 to retrieve subscriber account info and a corresponding charging policy such as a data rate or a tariff group per policy. Some embodiments of the PCRF 105 or the OCS 110 allocate different data rates or tariff groups to the candidate user plane entities to enhance network resource usage or efficiency. The PCRF 105 or the OCS 110 can also determine a maximum number of user plane entities that are included in credit management when applying credit pooling of user plane entities, e.g., a maximum of three user plane entity handovers are allowed during a single service session. The PCRF 105 separately determines charging policies for each of the candidate user plane entities and provides the difference charging policies to the PGW-C 150. Some embodiments of the PCRF 105 determine the different charging policies for the candidate user plane entities based on information provided by the PGW-C 150, the TDF-C 135, the OCS 110, or other entities.

The PGW-C 150 selects the subset of candidate user plane entities (PGW-U 155) based, at least in part, on the charging policies provided by the PCRF 105. Some embodiments of the PGW-C 150 consider additional information when performing the selection of the subset of candidate user plane entities. The additional information can include a charging priority level of a candidate user plane entity, a tariff group of a candidate user plane entity over a predetermined time window, CUPS features that are supported by the candidate user plane entity, online or off-line charging preferences (potentially depending on a subscriber account balance and configuration, one PDU session may involve online and off-line charging), usage thresholds at the candidate user plane entities, usage timers at the candidate user plane entities, handover capability of the quotas allocated to the candidate user plane entities, and the like. The PGW-C 150 combines the selection criteria received from the PCRF 105, the OCS 110, and other sources and stores the information locally, potentially with a timer to indicate how long the information remains valid. The PGW-C 150 is therefore able to re-select the subset of user plane entities during the PDU session in response to changes in network conditions such as handover of a user plane entity, expiration of a rate group timer, a user using up a credit quota, and the like.

In response to the PGW-C 150 selecting the subset of user plane entities, the PGW-C 150 triggers a charging request towards a charging system. The charging request is for online charging to the OCS 110, off-line charging to the OFCS 130, or a hybrid online/off-line charging request. The charging system responds with credit control data, usage thresholds for the selected subset of the user plane entities, credit pooling controls, and the like. The PGW-C 150 also provides monitoring and reporting rules to the selected PGW-U 155. The PGW-U 155 is configured based on the monitoring and reporting rules received from the PGW-C 150. Some embodiments of the PGW-U 155 are configured to monitor quota usage or thresholds and report this information to the PGW-C 150. The reports are provided periodically, at time intervals determined by a fixed or dynamic timer, in response to events, or in response to requests from the PGW-C 150. For example, the PGW-U 155 transmits a report to the PGW-C 150 in response to a credit threshold being met, a usage threshold being met, or other events.

The PGW-C 150 allocates credit quotas to the selected subset, which is represented by the PGW-U 155 in FIG. 1. Credit quota management is performed based on the charging policies received from the PCRF 105 or the OCS 110, as well as other parameters received from other entities in the network charging system 100, as discussed herein. The PGW-C 150 requests a single (or total) credit quota from the charging system. In some cases, the PGW-C 150 acts as a charging trigger function (CTF) for the PDU session. The PGW-C 150 therefore centrally manages the credit quota for allocation, distribution, or redistribution among the user plane entities (PGW-U 155) that are supporting the PDU session.

Prior to distributing or allocating quotas, the PGW-C 150 evaluates the credit needs of the subset PGW-U 155. Some embodiments of the PGW-C 150 evaluate the credit needs for each PGW-U 155 based on the corresponding charging policy received from the PCRF 105, as well as a charging category, which is determined based on an access type, a service type, a service dataflow, a quality-of-service (QoS), a number or rate of expected packets over a time interval, a demand or rate of charging, and the like. The parameters that influence the credit needs of the PGW-U 155 typically vary between the different user plane entities. For example, different charging categories typically have different average durations of access. The PGW-C 150 therefore separately evaluates the credit needs of each of the subset of PGW-U 155. The PGW-U 155 or the OCS 110 are also able to estimate quotas for each of the subset of PGW-U 155 based on quota consumption histories. The operator can configure history rules or experience in the PGW-C 150 to perform the evaluation and estimation. Initially, the evaluation/estimation is based on heuristics such as different predicted "rates of spend" of the subset of PGW-U 155. Subsequently, feedback received at the PGW-C 150 from the subset of PGW-U 155 is used to modify the initial predicted "rates of spend." For example, if one of the subset of PGW-U 155 has a typical median spend of ten units, the PGW-C 150 initially allocates this value plus a buffer. The allocated value is subsequently modified based on reports from the subset of PGW-U 155 that indicate actual spending rates.

The PGW-C 150 allocates portions of the total quota based on the expected credit needs of the subset PGW-U 155. Some embodiments of the PGW-C 150 allocate a portion of the total quota received from the PCRF 105 to itself for data or control signaling, as well as subsequent redistribution to the PGW-U 155. The PGW-C 150 also allocates portions of the total quota to the PGW-U 155 for data and control signaling associated with the PDU session. The portions that are allocated to the PGW-U 155 are available for handover to other user plane entities in the subset, e.g., in response to a handover.

In some embodiments, the PCRF 105 or the OCS 110 instructs the PGW-C 150 to allocate, distribute, or redistribute portions of quota to the PGW-U 155. For example, quota can be granted to the PGW-U 155 based on information in a CCA message transmitted by the PCRF 105. The PGW-C 150 can pass the granted quota directly to the PGW-U 155 without modification or the PGW-C 150 can modify the granted quota before providing it to the PGW-U 155. Quota modification rules are received from the PCRF 105 or they are provisioned by the operator IP services 145. The modification rules can be provisioned according to network or service conditions.

The PGW-C 150 dynamically manages quota consumption among the subset PGW-U 155 during the charging session, e.g., by reevaluating, rebalancing, and redistributing quota in response to changes at the PGW-U 155. Changes include termination of existing traffic to one or more user plane entities in the subset PGW-U 155, establishing new traffic to one or more user plane entities in the subset PGW-U 155, handover between the user plane entities in the subset PGW-U 155, and the like. In response to detecting a change, the PGW-C 150 reevaluates credit needs among the subset PGW-U 150, rebalances the remaining unused quotas, and redistributes the quota to the remaining user plane entities in the subset PGW-U 155. The reevaluation is performed based on spend rates or spend durations for the subset PGW-U 155. Redistribution of the quota includes redistribution of unused quota from the PGW-C 150 to one or more of the PGW-U 155 and redistribution of unused quota between the user plane entities in the subset PGW-U 155.

In some cases, the PGW-C 150 reports the redistribution to the PCRF 105 or the OCS 110. For example, the PGW-C 150 can report updates to the subset PGW-U 155, as well as other information related to quota management during the PDU session. The reports are sent periodically, in response to predetermined events, or at other times that are determined by the PCRF 105 or the OCS 110. The PGW-C 150 is also able to request new or additional credit quota from the PCRF 105 or the OCS 110 if the available quota becomes insufficient or falls below a threshold during the PDU session. The PGW-C 150 is also able to modify the quota distribution to one or more of the subset PGW-U 155 during the PDU session if the available quota becomes insufficient to support the PDU session. Quota changes can be based on access type, service type, service dataflow, QoS modification, and the like. The modification is used to reduce credit consumption without requesting additional quota from the PCRF 105 or the OCS 110, which is useful for online charging when credit is under a threshold. The PCRF 105 or the OCS 110 provides the policy in an initial or interim credit control answer (CCA) message, e.g., by modifying a QoS or rating of charging for one or more of the subset PGW-U 155 to reduce quota usage.

Interfaces between the PGW-C 150 and the PCRF 105 are configured to support dynamic selection of user plane entities and management of quotas according to credit pooling charging rules. The interface supports transmission of credit control requests (CCR) messages to dynamically establish charging rules and convey CUPS information on a per session basis. A message format for a CCR command transmitted from the PGW-C 150 to the PCRF 105 is:

```
<CC-Request> ::= < Diameter Header: 272, REQ, PXY
        < Session-Id >
        { Auth-Application-Id }
        { Origin-Host }
        { Origin-Realm }
        { Destination-Realm }
        { CC-Request-Type }
        { CC-Request-Number }
        [ Destination-Host ]
        [ Origin-State-Id ]
        *[ Subscription-Id ]
        *[ Supported-Features ]
        [ TDF-Information ]
        [ Network-Request-Support ]
        *[ Packet-Filter-Information ]
        [ Packet-Filter-Operation ]
        [ Bearer-Identifier ]
        [ Bearer-Operation ]
        [ Framed-IP-Address ]
        [ Framed-IPv6-Prefix ]
        [ IP-CAN-Type ]
        [ 3GPP-RAT-Type ]
        [ RAT-Type ]
        [ Termination-Cause ]
        [ User-Equipment-Info ]
        [ QoS-Negotiation ]
        [ QoS-Upgrade ]
```

-continued

```
        [ Default-EPS-Bearer-QoS ]
     0*2[ AN-GW-Address ]
        [ 3GPP-SGSN-MCC-MNC ]
        [ 3GPP-SGSN-Address ]
        [ 3GPP-SGSN-IPv6-Address ]
        [ 3GPP-GGSN-Address ]
        [ 3GPP-GGSN-IPv6-Address ]
        [ RAI ]
        [ 3GPP-User-Location-Info ]
        [ 3GPP-MS-TimeZone ]
        [ Called-Station-Id ]
        [ PDN-Connection-ID ]
        [ Bearer-Usage ]
        [ Online ]
        [ Offline ]
        *[ TFT-Packet-Filter-Information ]
        *[ Charging-Rule-Report ]
     *[ ADC-Rule-Report ]
        *[ Application-Detection-Information ]
        *[ Event-Trigger ]
        [ Event-Report-Indication ]
        [ Access-Network-Charging-Address ]
        *[ Access-Network-Charging-Identifier-Gx ]
        *[ CoA-Information ]
        *[ Usage-Monitoring-Information ]
        [ Routing-Rule-Install ]
        [ Routing-Rule-Remove ]
        [ Logical-Access-ID ]
        [ Physical-Access-ID ]
        *[ Proxy-Info ]
        *[ Route-Record ]
        [ CUPS-Information ]
        *[ AVP ]
     CUPS-INFORMATION :: = < AVP HEADER>
        [ CPF-ID ] // S/P-GWC ID, OR OPTIONALLY FOR 5G FORWARD
     COMPATIBILITY REASONS
        * [ UPF-INFORMATION ] // S/P-GWU INFORMATION
        *[AVP ]
     UPF-INFORMATION ::= < AVP HEADER>
        [ UPF-ID ] S/P-GWU ID, OR OPTIONALLY FOR 5G FORWARD
     COMPATIBILITY REASONS
        *[ CUPS-Supported-Features ]
        [ Rating-Group ]
        *[AVP ]
```

The PCRF 105 acknowledges receipt of the CCR message by sending back a CCA message to the PGW-C 150. A message format for a CCA command transmitted from the PCRF 105 to the PGW-C 150 is:

```
<CC-Answer> ::= < Diameter Header: 272, PXY >
        < Session-Id >
        { Auth-Application-Id }
        { Origin-Host }
        { Origin-Realm }
        [ Result-Code ]
        [ Experimental-Result ]
        { CC-Request-Type }
        { CC-Request-Number }
        *[ Supported-Features ]
        [ Bearer-Control-Mode ]
        *[ Event-Trigger ]
        [ Origin-State-Id ]
        *[ Redirect-Host ]
        [ Redirect-Host-Usage ]
        [ Redirect-Max-Cache-Time ]
        *[ Charging-Rule-Definition ] // included for Rating Group for UPF
        *[ Charging-Rule-Remove ]
        *[ Charging-Rule-Install ]
     *[ ADC-Rule-Remove ]
     *[ ADC-Rule-Install ]
        [ Charging-Information ]
        [ Online ]
        [ Offline ] // online to offline deversion
        [ Revalidation-Time ]
        [ ADC-Revalidation-Time ]
        [ Default-EPS-Bearer-QoS ]
```

```
            [ Bearer-Usage ]
            [ 3GPP-User-Location-Info ]
           *[ Usage-Monitoring-Information ]
           *[ CSG-Information-Reporting ]
            [ User-CSG-Information ]
            [ Error-Message ]
            [ Error-Reporting-Host ]
           *[ Failed-AVP ]
           *[ Proxy-Info ]
           *[ Route-Record ]
           *[ AVP ]
Charging-Rule-Definition ::= < AVP Header: 1003 >
               { Charging-Rule-Name }
               [ Service-Identifier ]
               [ Rating-Group ]
              *[ Flow-Description ]
               [ Reporting-Level ]
               [ Online ]
               [ Offline ]
               [ Metering-Method ]
               [ Precedence ]
               [ AF-Charging-Identifier ]
              *[ UPF-Information ]
              *[ Flows ]
                  *[ AVP ]
UPF-INFORMATION ::= < AVP HEADER>
      [ UPF-ID ] S/P-GWU ID, OR OPTIONALLY FOR 5G FORWARD
COMPATIBILITY REASONS
      [ Rating-Group ]
     *[ CUPS-Supported-Features ]
     *[AVP ]
CUPS-SUPPORTED-FEATURES ::= < AVP HEADER>
      [ CPF-ID ] // S/P-GWC ID, OR OPTIONALLY FOR 5G FORWARD
COMPATIBILITY REASONS
      [ UPF-ID ] // S/P-GWU ID, OR OPTIONALLY FOR 5G FORWARD
COMPATIBILITY REASONS
      [ DN-ID ] // OPTIONALLY INCLUDED FOR 5G FORWARD
COMPATIBILITY REASONS
      [ UPF-USAGE-THRESHOLD ] // THIS SETS UP THE USAGE
THRESHOLD FOR REPORTING XGWU
      [ UPF-USAGE-TIMER ] // THIS SETS UP THE TIME THRESHOLD FOR
REPORTING AT XGWU
      [ UPF-HANDOVER-CAPABILITY ] // NEEDED IF UPF HANDOVERS
ARE INDICATED
      [ UPF-CREDIT-POOLING-CAPABILITY ] // NEEDED IF NEW XGWU
SHOULD PERFORM POOLING
      [ UPF-REPORTING ]
     *[AVP ]
```

A format for a CCR command that is transmitted from the PGW-C 150 to the OCS 110 is:

```
<CCR> ::= < DIAMETER HEADER: 272, REQ, PXY >
       < SESSION-ID >
       { ORIGIN-HOST }
       { ORIGIN-REALM }
       { DESTINATION-REALM }
       { AUTH-APPLICATION-ID }
       { SERVICE-CONTEXT-ID }
       { CC-REQUEST-TYPE }
       { CC-REQUEST-NUMBER }
       [ DESTINATION-HOST ]
       [ USER-NAME ]
       [ ORIGIN-STATE-ID ]
       [ EVENT-TIMESTAMP ]
      *[ SUBSCRIPTION-ID ]
       [ TERMINATION-CAUSE ]
       [ REQUESTED-ACTION ]
       [ AOC-REQUEST-TYPE ]
       [ MULTIPLE-SERVICES-INDICATOR ]
      *[ MULTIPLE-SERVICES-CREDIT-CONTROL ]
       [ CC-CORRELATION-ID ]
       [ USER-EQUIPMENT-INFO ]
      *[ PROXY-INFO ]
      *[ ROUTE-RECORD ]
       [ SERVICE-INFORMATION ]
```

-continued

```
<Multiple-Services-Credit-Control> ::= < AVP Header: 456 >
       [ GRANTED-SERVICE-UNIT ]
       [ REQUESTED-SERVICE-UNIT ]
      *[ USED-SERVICE-UNIT ]
      *[ SERVICE-IDENTIFIER ]
       [ ONLINE-ONLY ]
       [ OFFLINE-ONLY ]
       [ ONLINE-OFFLINE ]
       [ CUPS-POOLING-UNIT ]
       [ Rating-Group ]
      *[ G-S-U-Pool-Reference ]
       [ Validity-Time ]
       [ Result-Code ]
       [ Final-Unit-Indication ]
       [ Time-Quota-Threshold ]
       [ Volume-Quota-Threshold ]
       [ Unit-Quota-Threshold ]
       [ Quota-Holding-Time ]
       [ Quota-Consumption-Time ]
      *[ Reporting-Reason ]
       [ Trigger ]
       [ PS-Furnish-Charging-Information ]
       [ Refund-Information ]
      *[ AF-Correlation-Information ]
```

```
        *[ Envelope ]
          [ Envelope-Reporting ]
          [ Time-Quota-Mechanism ]
        * [ Service-Specific-Info ]
        [ QoS-Information ]
        * [ Announcement-Information ]
            [ 3GPP-RAT-Type ]
        [ Related-Trigger ]
SERVICE-INFORMATION ::= < AVP HEADER:873>
        *[ SUBSCRIPTION-ID ]
        [AOC-INFORMATION ]
        [ PS-INFORMATION ]
        [ IMS-INFORMATION ]
        [ MMS-INFORMATION ]
        [ LCS-INFORMATION ]
        [ POC-INFORMATION ]
        [ MBMS-INFORMATION ]
        [ SMS-INFORMATION ]
        [ VCS-INFORMATION ]
        [ MMTEL-INFORMATION ]
        [ PROSE-INFORMATION ]
        [ SERVICE-GENERIC-INFORMATION ]
        [ IM-INFORMATION ]
        [ DCD-INFORMATION ]
        [ M2M-INFORMATION ]
        [ CPDT-INFORMATION ]
        *[ CUPS-INFORMATION ]
CUPS-INFORMATION :: = < AVP HEADER >
    [ CPF-ID ] // S/P-GWC ID, OR OPTIONALLY FOR 5G FOR-
WARD
COMPATIBILITY REASONS
        *[ UPF-INFORMATION ] // S/P-GWU INFORMATION
        *[AVP ]
UPF-INFORMATION ::= < AVP HEADER >
        [ UPF-ID ] S/P-GWU ID, OR OPTIONALLY FOR 5G FOR-
WARD
COMPATIBILITY REASONS
            *[ CUPS-Supported-Features ]
            [ Rating-Group ]
                *[AVP ]
```

Figure 2:
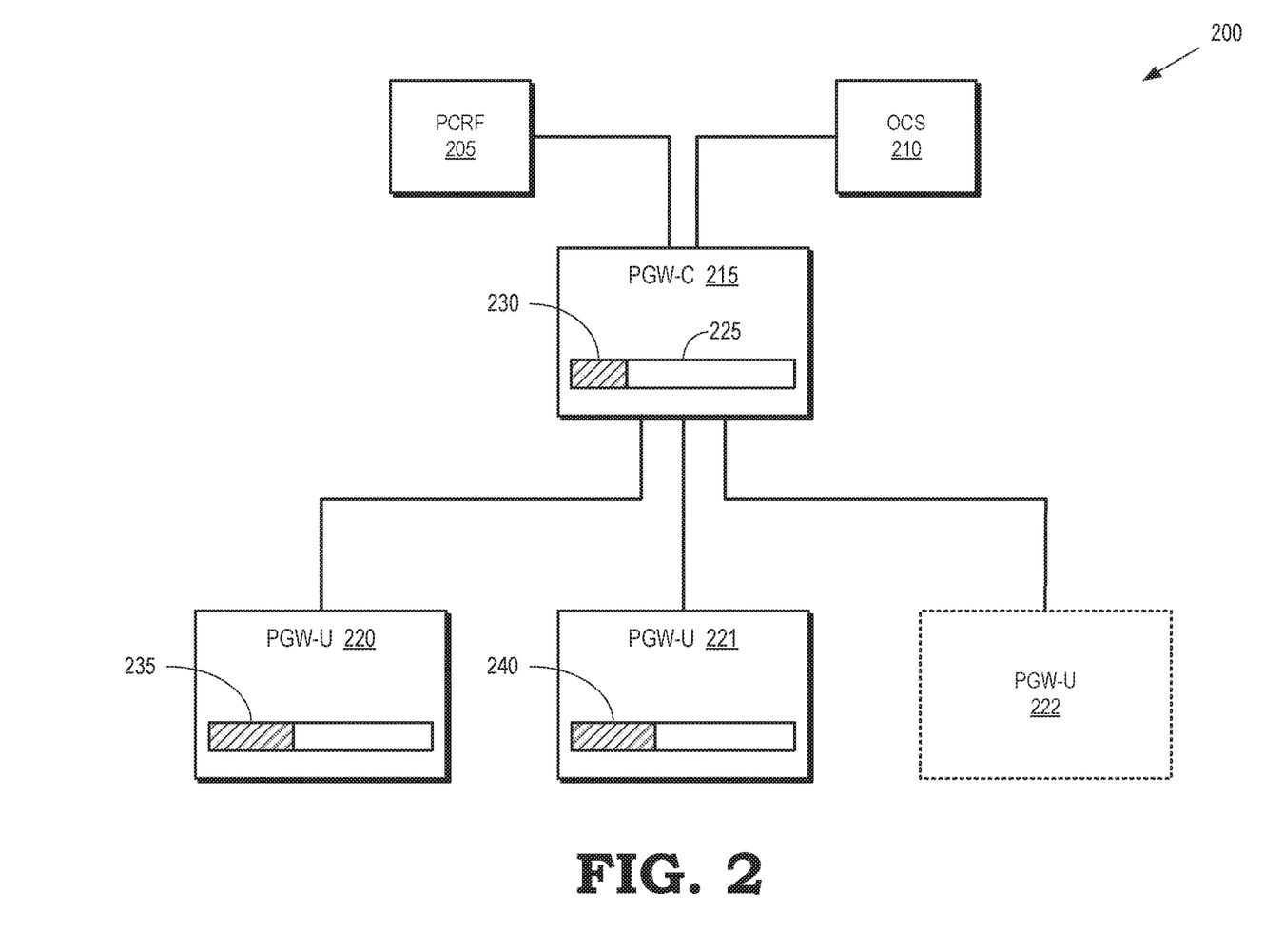
FIG. 2 is a block diagram of a communication system that includes a control plane entity that selects and allocates quotas to a subset of candidate user plane entities according to some embodiments.

FIG. 2 is a block diagram of a communication system 200 that includes a control plane entity that selects and allocates quotas to a subset of candidate user plane entities according to some embodiments. The network charging system 100 includes a PCRF 205 and an OCS 210 that correspond to some embodiments of the PCRF 105 and OCS 110 shown in FIG. 1. A PGW in the network charging system 100 is separated into a control plane entity, PGW-C 215, and a set of user plane entities PGW-U 220, 221, 222, which are collectively referred to herein as "the PGW-U 220-222." Although the selection and quota management techniques are discussed in the context of a PGW in FIG. 2, the same or similar principles apply to other entities that implement separate control and user planes such as an SGW or a TDF, as well as entities in other types of wireless communication systems such as 5G systems that implement control and user plane separation.

As discussed herein, the PGW-C 215 transmits requests to the PCRF 205 for charging policies associated with the candidate PGW-U 220-222. In some embodiments, the request is transmitted in response to a user (or corresponding user equipment) establishing a PDU session with the communication system 200. The PCRF 205 responds with charging policies that include separate charging policies for each of the candidate PGW-U 220-222. Thus, the charging policies are per-user plane entity charging policies that can be used to establish different charging policies for the different user plane entities. Based on the received charging policies, the PGW-C 215 selects a subset of the PGW-U 220-222 to support the PDU session established by the user. In the illustrated embodiment, the PGW-C 215 selects a subset including the PGW-U 220 and the PGW-U 221. The PGW-U 222 is not included in the subset that supports the PDU session, as indicated by the dotted line box.

The PGW-C 215 transmits requests to the OCS 210 for information indicating a total quota 225 that is allocated to the PDU session, e.g., in response to a request from the PGW-C 215. The PGW-C 215 allocates the total quota 225 received from the OCS 210 based on the charging policies received from the PCRF 205. In the illustrated embodiment, the PGW-C 215 allocates a first portion 230 of the total quota 225 to itself to support data or control signaling, as well as for possible redistribution to the PGW-U 220 or the PGW-U 221. The PGW-C 215 allocates a second portion 235 of the total quota 225 to the PGW-U 220 a third portion 240 of the total quota 225 to the PGW-U 221. The sum of the first portion 230, the second portion 235, and the third portion 240 is equal to or less than the total quota 225. Some embodiments of the PGW-C 215 reserve a portion of the total quota 225 for subsequent redistributions. The user consumes quota that is allocated to the entity that is currently supporting the PDU session. For example, if the PDU session is established with the PGW-U 220, data or control signaling associated with the PDU session consumes the portion 235 of the total quota 225. Unused portions of the total quota 225 are in some cases available for redistribution, e.g. in response to consumption of the quota or handoff.

Figure 3:
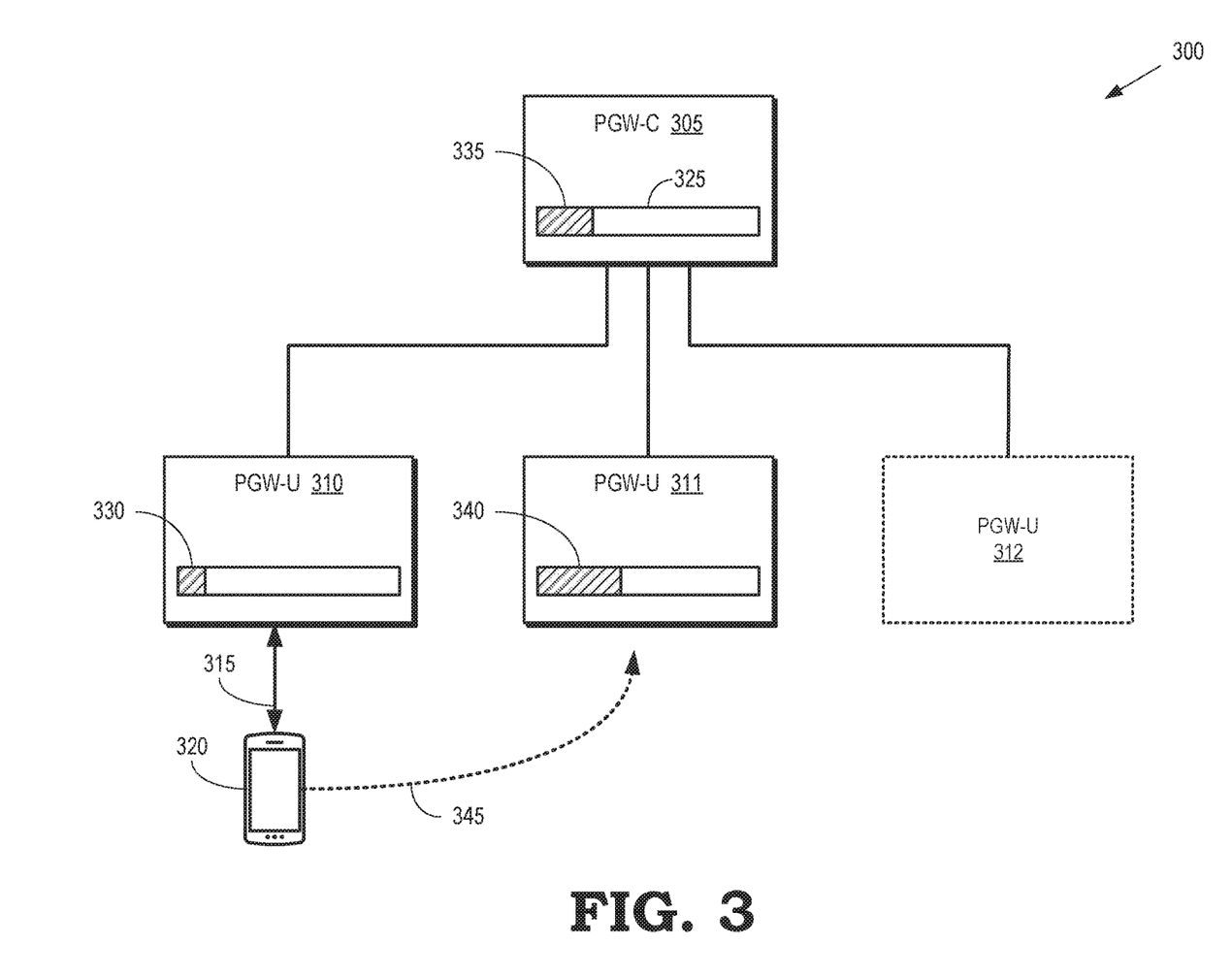
FIG. 3 is a block diagram of a communication system that includes a control plane entity that manages quotas for a subset of user plane entities according to some embodiments.

FIG. 3 is a block diagram of a communication system 300 that includes a control plane entity that manages quotas for a subset of user plane entities according to some embodiments. A PGW in the communication system 300 is separated into a control plane entity, PGW-C 305, and a set of user plane entities PGW-U 310, 311, 312, which are collectively referred to herein as "the PGW-U 310-312." As discussed herein, the PGW-C 305 has selected the PGW-U 310 and the PGW-U 311 to support a communication session such as a PDU session 315 with a user equipment 320. The PGW-C 305 has also allocated portions of a total quota 325 to the PGW-C 305, the PGW-U 310, and the PGW-U 311. Initially, the PGW-U 310 is supporting the PDU session 315 with the user equipment 320 using a remaining, unused portion 330 of the total quota 325. The PGW-C 305 includes a portion 335 of the total quota 325 and the PGW-U 311 includes a portion 340 of the total quota 325. A handover of the PDU session 315 to the PGW-U 311 is initiated, as indicated by the arrow 345.

Figure 4:
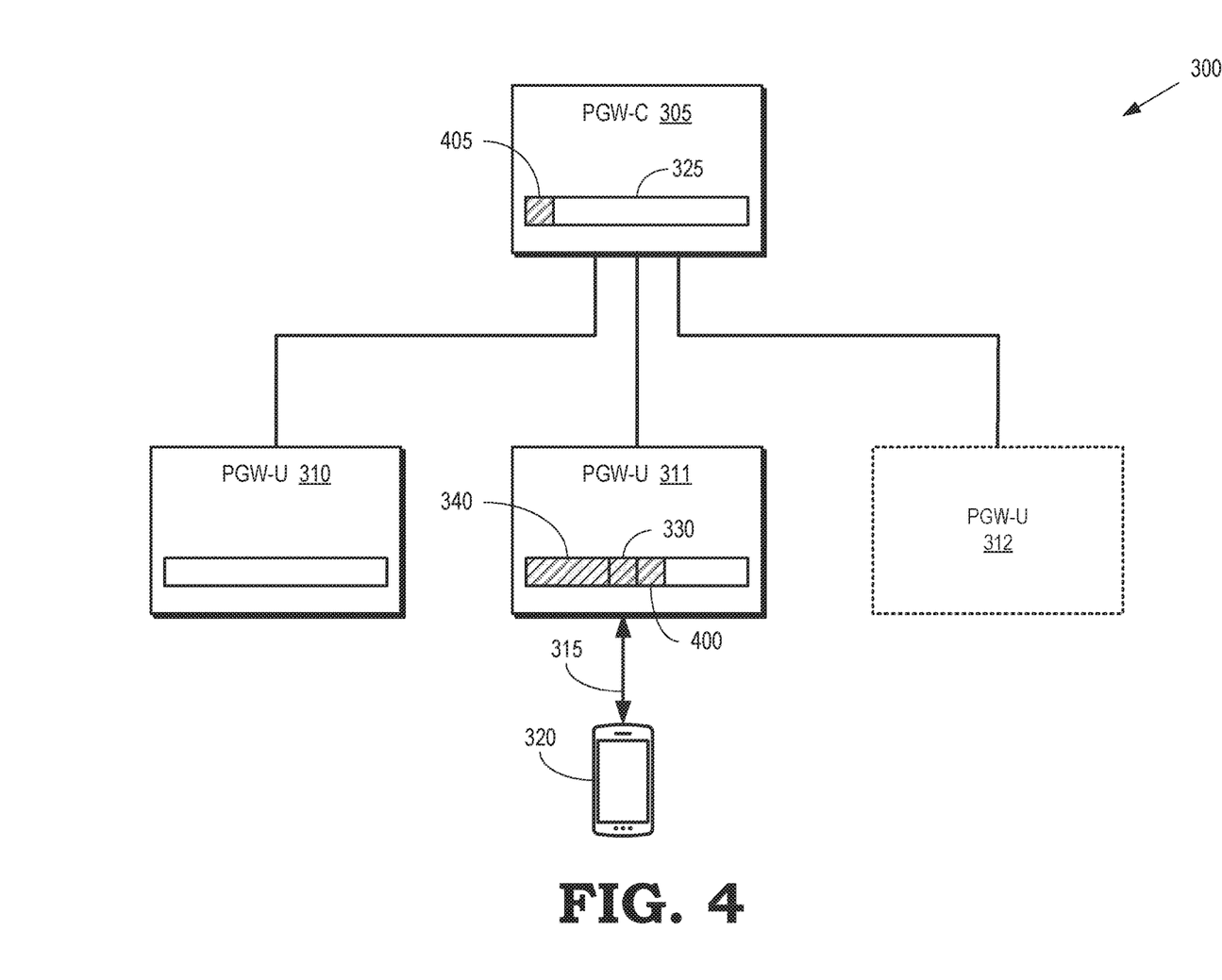
FIG. 4 is a block diagram of the communication system shown in FIG. 3 subsequent to handover of the user equipment and redistribution of quotas according to some embodiments.

FIG. 4 is a block diagram of the communication system 300 subsequent to handover of the user equipment and redistribution of quotas according to some embodiments. In the illustrated embodiment, the user equipment 320 is handed over the PDU session 315 from the PGW-U 310 to the PGW-U 311. In response to the handover, the PGW-C 305 redistributes quota among the entities in the communication system 300. For example, the unused portion 330 of the total quota is redistributed from the PGW-U 310 to the PGW-U 311. For another example, a portion 400 of the portion 335 of the total quota 325 that was allocated to the PGW-C 305 is redistributed to the PGW-U 311, leaving a portion 405 for use by the PGW-C 305. Thus, the PGW-U 311 is able to use quota equal to a sum of the portion 340, the portion 330, and the portion 400 to support the PDU session 315. Although not specifically shown in FIG. 4, some embodiments of the PGW-C 305 perform other redistributions including moving unused quota from the PGW-U 310 to the PGW-C 305, recalling some or all of the portion 340 from the PGW-U 311, and the like.

Figure 5:
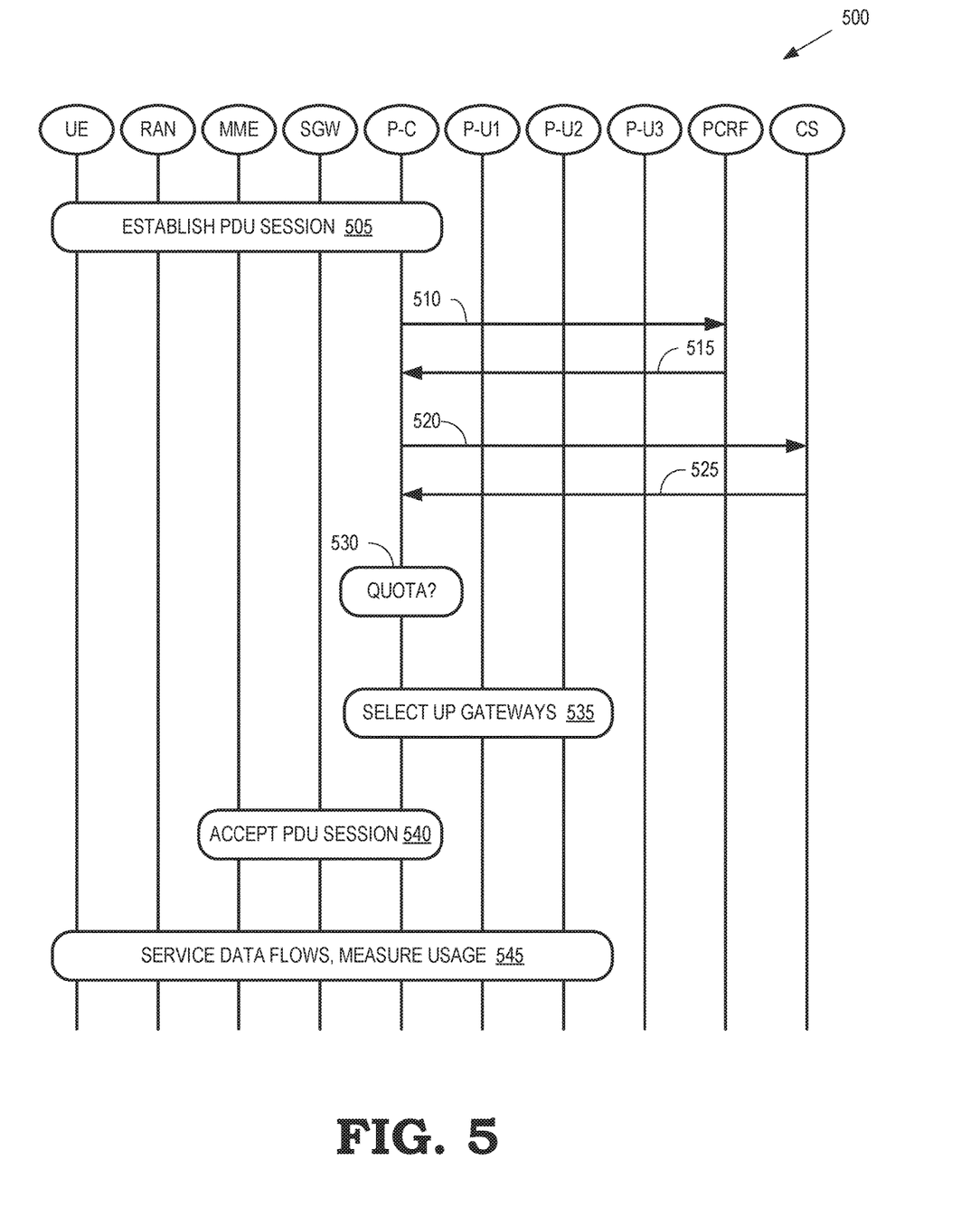
FIG. 5 is a call flow in which a control plane entity selects one or more user plane entities based on charging policies for the user plane entities according to some embodiments.

FIG. 5 is a call flow 500 in which a control plane entity selects one or more user plane entities based on charging policies for the user plane entities according to some embodiments. The call flow 500 is implemented in some embodiments of the network charging system 100 shown in FIG. 1. The call flow 500 includes operations performed by, and messages exchanged between, entities in the communication system including user equipment (UE), a radio access network (RAN), a mobility management entity (MME), an SGW that may be separated into control and user planes, a PGW control plane entity (P-C), three candidate PGW user plane entities (P-U1, P-U2, P-U3), a PCRF, and a charging system (CS).

A PDU session is established at block 505. In response to establishment of the PDU session, the PGW control plane entity requests PCC rules for the three candidate PGW user plane entities from the PCRF, as indicated by the arrow 510. The PCRF responds by providing the PCC rules, e.g., charging policies, to the PGW control plane entity, as indicated by the arrow 515. The PGW control plane entity then requests a PDU charging session by transmitting a request 520 to the charging system, which responds with a granted total credit quota, as indicated by the arrow 525.

At block 530, the PGW control plane entity estimates the quota requirements of the candidate PGW user plane entities. At block 535, the PGW control plane entity selects the user plane (UP) gateways to support the PDU session. In the illustrated embodiment, the PGW control plane entity selects P-U1 and P-U2 as the PGW user plane entities to support the PDU session. The PGW control plane entity then allocates portions of the quota to the selected subset of the PGW user plane entities. In response to selecting the subset and allocating the portions of the quota to the selected subset, the PGW control plane entity accepts the PDU session at block 540. Uplink or downlink data flows for the PDU session are serviced at block 545. The subset of the PGW user plane entities perform various measurements on packets conveyed by the PDU session to monitor usage for comparison with the allocated quotas.

Figure 6:
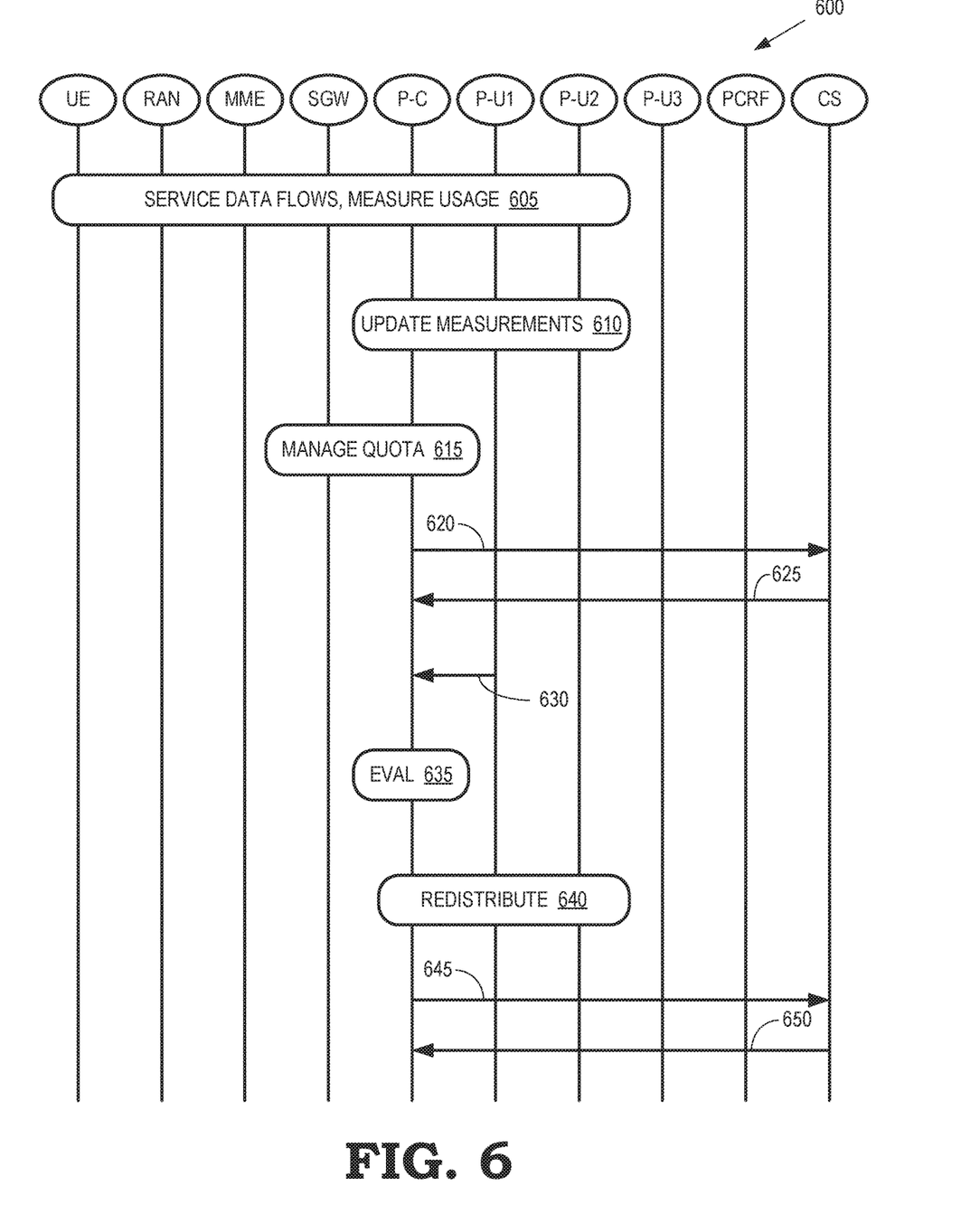
FIG. 6 is a call flow in which a control plane entity manages quotas for one or more user plane entities based on charging policies for the user plane entities according to some embodiments.

FIG. 6 is a call flow 600 in which a control plane entity manages quotas for one or more user plane entities based on charging policies for the user plane entities according to some embodiments. The call flow 600 is implemented in some embodiments of the network charging system 100 shown in FIG. 1. The call flow 600 includes operations performed by, and messages exchanged between, entities in the communication system including user equipment (UE), a radio access network (RAN), a mobility management entity (MME), an SGW that may be separated into control and user planes, a PGW control plane entity (P-C), three candidate PGW user plane entities (P-U1, P-U2, P-U3), a PCRF, and a charging system (CS). A PDU session has been established for communication and the PGW user plane entities P-U1 and P-U2 selected to support the PDU session. Quotas have been allocated and uplink or downlink data flows for the PDU session are serviced at block 605.

The subset of the PGW user plane entities perform various measurements on packets conveyed by the PDU session to monitor usage for comparison with the allocated quotas. The updated measurements are provided to the PGW control plane entity at block 610. The PGW control plane entity manages the quota consumptions based on the updated measurements provided by the subset of the PGW user plane entities at block 615. The PGW control plane entity then transmits an update to the charging system including information including charging information for the PDU session, as indicated by the arrow 620. The charging system provides a confirmation in response, as indicated by the arrow 625.

The PGW user plane entity P-U1 reports that it has consumed all of its allocated quota, as indicated by the arrow 630. In response, the PGW control plane entity reevaluates the quota allocations at block 635 and rebalances the quotas to provide additional quota to the PGW user plane entity P-U1. At block 640, the PGW control plane entity redistributes portions of the quota based on the rebalancing. Redistributing quota can include redistributing quota from the PGW control plane entity to the PGW user plane entity P-U1 or redistributing quota from the PGW user plane entity P-U2 to the PGW user plane entity P-U1. In some embodiments, the PGW control plane entity requests additional quota from the PCRF or the charging system and then redistributes the additional quota to the PGW user plane entity P-U1. Results of the redistribution are reported to the charging system, as indicated by the arrow 645. The charging system acknowledges receipt of the reports, as indicated by the arrow 650.

Figure 7:
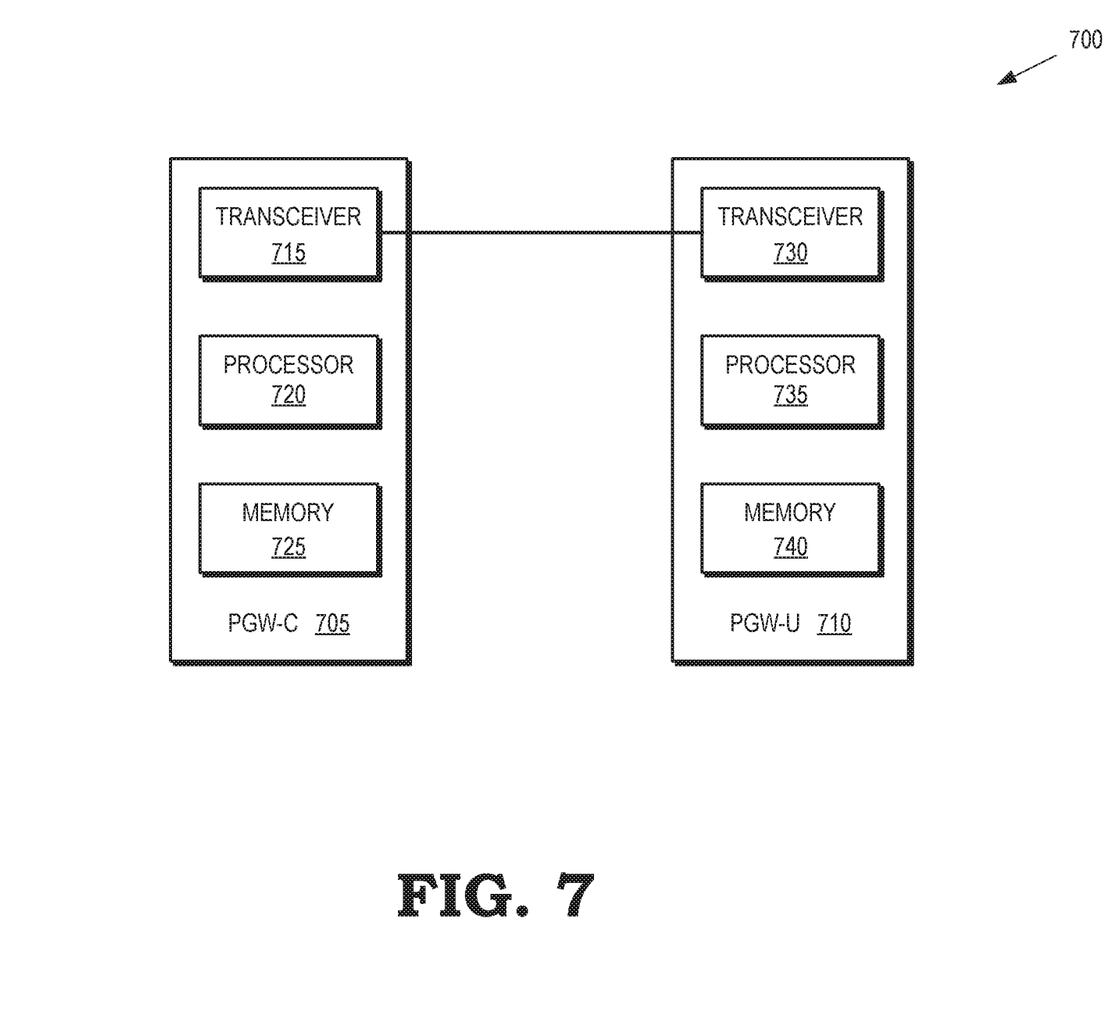
FIG. 7 is a block diagram of a communication system that implements separation of control plane and user plane entities according to some embodiments.

FIG. 7 is a block diagram of a communication system 700 that implements separation of control plane and user plane entities according to some embodiments. The communication system 700 includes a PGW that is separated into a control plane entity PGW-C 705 and a user plane entity PGW-U 710, which are used to implement corresponding entities in some embodiments of the network charging system 100 shown in FIG. 1.

The PGW-C 705 includes a transceiver 715 for transmitting and receiving signals including messages exchanged with the PGW-U 710. The PGW-C 705 also includes a processor 720 and a memory 725. The processor 720 executes instructions stored in the memory 725 and stores information in the memory 725 such as the results of the executed instructions. Some embodiments of the transceiver 715, the processor 720, and the memory 725 are configured to perform portions of the call flow 500 shown in FIG. 5 and the call flow 600 shown in FIG. 6.

The PGW-U 710 includes a transceiver 730 for transmitting and receiving signals including messages exchanged with the PGW-C 705. The PGW-U 710 also includes a processor 735 and a memory 740. The processor 735 executes instructions stored in the memory 740 and stores information in the memory 740 such as the results of the executed instructions. Some embodiments of the transceiver 730, the processor 735, and the memory 740 are configured to perform portions of the call flow 500 shown in FIG. 5 and the call flow 600 shown in FIG. 6.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   selecting, at a control plane entity, a subset of a plurality of user plane entities to support a charging session associated with a user equipment based on charging policies for the plurality of user plane entities;
   allocating, at the control plane entity, portions of a quota for the charging session to the control plane entity and the subset of the plurality of user plane entities based on the charging policies; and
   redistributing an unused portion of the portion of the quota allocated to the control plane entity to one of the subset of the plurality of user plane entities.

2. The method of claim 1, wherein allocating the portions of the quota comprises allocating at least one of a charging credit control threshold, a charging quota threshold, and a usage threshold to the control plane entity and the subset of the plurality of user plane entities.

3. The method of claim 1, further comprising:
   transmitting, from the control plane entity, a request for the charging policies to at least one of a charging system, a policy and charging rules function (PCRF), and a policy control function (PCF), and
   wherein selecting the subset of the plurality of user plane entities comprises selecting the subset in response to receiving the charging policies.

4. The method of claim 3, wherein transmitting the request comprises transmitting the request for the charging policies in response to the user equipment establishing a protocol data unit (PDU) session, wherein transmitting the request comprises transmitting a request comprising information identifying the plurality of user plane entities, and wherein transmitting the request comprises transmitting at least one of information indicating service features supported by the plurality of user plane entities, location information for the plurality of user plane entities, location information for the user equipment, capacities of the plurality of user equipment, and load levels on the plurality of user equipment.

5. The method of claim 1, wherein selecting the subset based on the charging policies comprises selecting the subset based on at least one of charging rates for the plurality of user plane entities and tariff groups for the plurality of user plane entities.

6. The method of claim 1, further comprising:
   selecting the subset of the plurality of user plane entities based on charging priority levels for the plurality of user plane entities, features supported by the plurality of user plane entities, online/off-line charging preferences of user equipment, usage thresholds at the plurality of user plane entities, usage timers at the plurality of user plane entities, and handover capabilities of the plurality of user plane entities.

7. A control plane entity comprising:
   a memory to store charging policies for a plurality of user plane entities; and
   a processor configured to:
      select a subset of the plurality of user plane entities to support a charging session associated with a user equipment based on the charging policies;
      allocate portions of a quota for the charging session to the control plane entity and the subset of the plurality of user plane entities based on the charging policies; and
      redistribute an unused portion of the portion of the quota allocated to the control plane entity to one of the subset of the plurality of user plane entities.

8. The control plane entity of claim 7, wherein the processor is configured to allocate at least one of a charging credit control threshold, a charging quota threshold, a usage threshold to the subset of the plurality of user plane entities.

9. The control plane entity of claim 7, further comprising:
   a transceiver configured to transmit a request for the charging policies to at least one of a charging system, a policy and charging rules function (PCRF), and a policy control function (PCF), and
   wherein the processor is configured to select the subset in response to the transceiver receiving the charging policies.

10. The control plane entity of claim 9, wherein the transceiver is configured to transmit the request for the charging policies in response to the user equipment establishing a protocol data unit (PDU) session, wherein the transceiver is configured to transmit information identifying the plurality of user plane entities in the request, and wherein the transceiver is configured to transmit at least one of information indicating service features supported by the plurality of user plane entities, location information for the plurality of user plane entities, location information for user equipment, capacities of the plurality of user equipment, and load levels on the user equipment.

11. The control plane entity of claim 7, wherein the processor is configured to select the subset based on at least one of charging rates for the plurality of user plane entities and tariff groups for the plurality of user plane entities.

12. The control plane entity of claim 7, wherein the processor is configured to select the subset of the plurality of user plane entities based on charging priority levels for the plurality of user plane entities, features supported by the plurality of user plane entities, online/off-line charging preferences of the user equipment, usage thresholds at the plurality of user plane entities, usage timers at the plurality of user plane entities, and handover capabilities of the plurality of user plane entities.

13. A first user plane entity comprising:
a transceiver to receive, from a control plane entity, information indicating that the first user plane entity is selected as one of a plurality of user plane entities to support a charging session associated with a user equipment based on charging policies for the plurality of user plane entities, wherein the transceiver is also configured to receive information indicating an allocated portion of a quota for the charging session, wherein the transceiver is configured to receive information indicating that an unused portion of a portion of the quota allocated to the control plane entity is redistributed to the first user plane entity; and
a processor configured to establish a communication session with the user equipment in response to receiving the information indicating that the first user plane entity is selected as one of the plurality of user plane entities to support the charging session.

14. The first user plane entity of claim 13, wherein the transceiver is configured to receive information indicating that a portion of the quota allocated to a second user plane entity in the plurality of user plane entities is redistributed to the first user plane entity.

15. The first user plane entity of claim 13, wherein the transceiver is configured to receive, from the control plane entity, a request to redistribute an unused portion of the quota allocated to the first user plane entity to a second user plane entity in response to the user equipment handing off from the first user plane entity to the second user plane entity.

* * * * *